(12) United States Patent
Castle

(10) Patent No.: US 9,095,220 B1
(45) Date of Patent: Aug. 4, 2015

(54) INFANT SEAT COVERING SYSTEM

(71) Applicant: Irena Castle, Lewis Center, OH (US)

(72) Inventor: Irena Castle, Lewis Center, OH (US)

( * ) Notice: Subject to any disclaimer, the term of this patent is extended or adjusted under 35 U.S.C. 154(b) by 149 days.

(21) Appl. No.: 14/027,357

(22) Filed: Sep. 16, 2013

(51) Int. Cl.
| | |
|---|---|
| *A47C 29/00* | (2006.01) |
| *A47C 7/66* | (2006.01) |
| *B60N 2/60* | (2006.01) |
| *A47C 31/11* | (2006.01) |
| *A47D 15/00* | (2006.01) |
| *B60N 2/28* | (2006.01) |
| *A47D 13/02* | (2006.01) |

(52) U.S. Cl.
CPC . *A47C 7/66* (2013.01); *A47C 31/11* (2013.01); *A47D 15/00* (2013.01); *B60N 2/2839* (2013.01); *B60N 2/6027* (2013.01); *B60N 2/6063* (2013.01); *A47D 13/02* (2013.01); *B60N 2/2842* (2013.01); *B60N 2/2854* (2013.01)

(58) Field of Classification Search
USPC ........................................ 297/184.13, 184.11
See application file for complete search history.

(56) References Cited

U.S. PATENT DOCUMENTS

| | | | | |
|---|---|---|---|---|
| 2,590,664 | A * | 3/1952 | Weaklend | 297/184.11 |
| 4,583,779 | A * | 4/1986 | Myers | 297/184.13 |
| 5,618,082 | A * | 4/1997 | Jachmich | 297/229 |
| 5,765,893 | A * | 6/1998 | Ziegler | 297/256.15 |
| 5,988,742 | A * | 11/1999 | Stevens | 297/219.12 |
| 6,237,998 | B1 * | 5/2001 | Aprile | 297/219.12 |
| 6,517,153 | B1 * | 2/2003 | Brewer | 297/184.13 |
| 7,083,228 | B1 * | 8/2006 | Al Sawan | 297/184.13 |
| 7,967,378 | B2 * | 6/2011 | Narboni-Campora | 297/219.12 |
| 2002/0125747 | A1 * | 9/2002 | Drost et al. | 297/184.13 |
| 2002/0130536 | A1 * | 9/2002 | Kams | 297/184.13 |
| 2003/0046763 | A1 * | 3/2003 | Chancey | 5/482 |
| 2009/0053432 | A1 * | 2/2009 | Metz-Topodas et al. | 428/33 |
| 2009/0091165 | A1 * | 4/2009 | Thompson | 297/228.12 |
| 2009/0096257 | A1 * | 4/2009 | Gordon et al. | 297/184.12 |
| 2010/0038953 | A1 * | 2/2010 | Collins et al. | 297/465 |
| 2010/0072793 | A1 * | 3/2010 | Kress | 297/184.13 |
| 2011/0312243 | A1 * | 12/2011 | Schoen et al. | 446/227 |
| 2012/0062001 | A1 * | 3/2012 | Krasley | 297/184.13 |
| 2014/0021751 | A1 * | 1/2014 | Lang et al. | 297/184.13 |
| 2014/0132043 | A1 * | 5/2014 | Rodormer | 297/184.13 |

OTHER PUBLICATIONS

"The Original Dookie", screenshots from url: <<http://dooky.xplorys.com/index.php/>>, Aug. 14, 2013, attached hereto as "NPL_DOOKY.PDF".

* cited by examiner

*Primary Examiner* — David E Allred
(74) *Attorney, Agent, or Firm* — Ronald J. Koch

(57) ABSTRACT

An infant seat covering system comprises a cover, two elastic side straps having hooks at the ends thereof, a plurality of ovoid clasps and cooperating eyelets for engaging an infant seat, two retraction hooks for engaging a series of retraction eyelets disposed longitudinally along a back portion of the cover, the retraction hooks being disposed near an upper portion of the cover on a front portion of the cover whereby the cover can be retracted to one or more retracted positions according to the refraction eyelets.

2 Claims, 5 Drawing Sheets

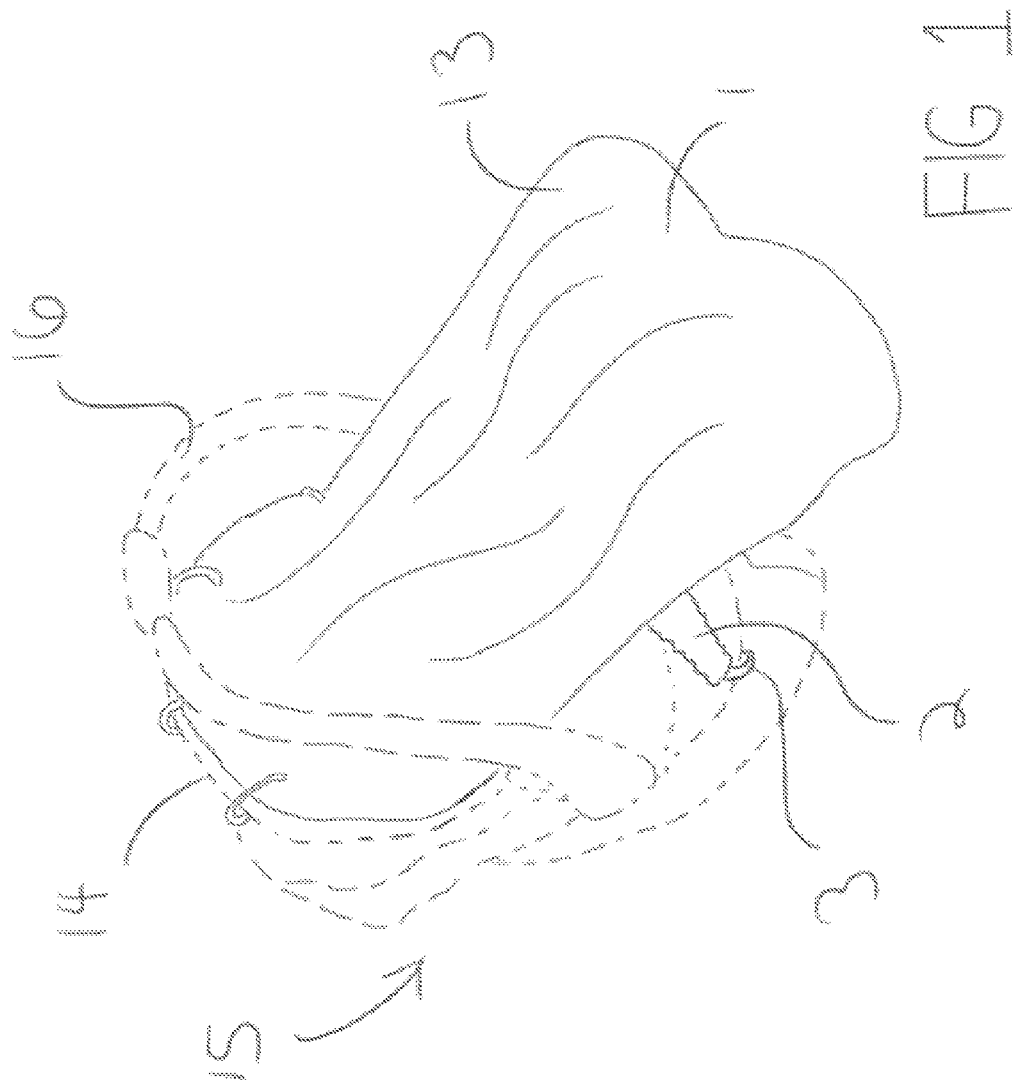

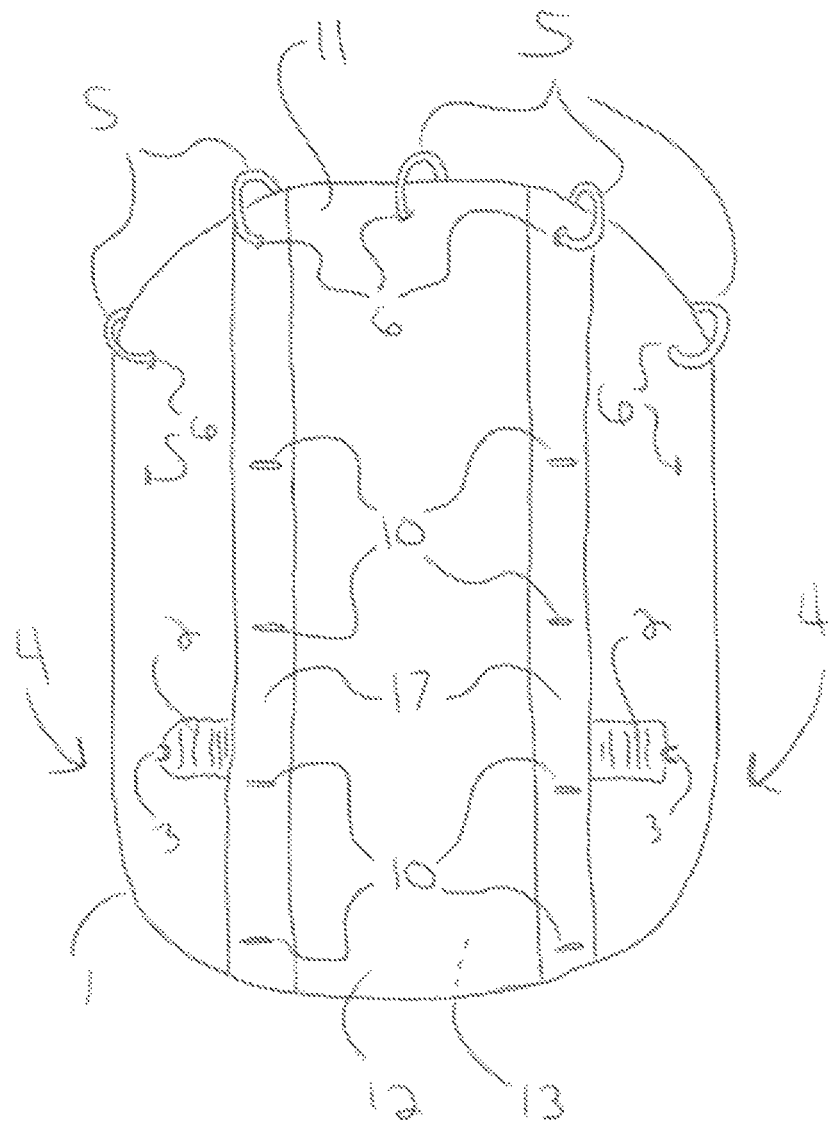

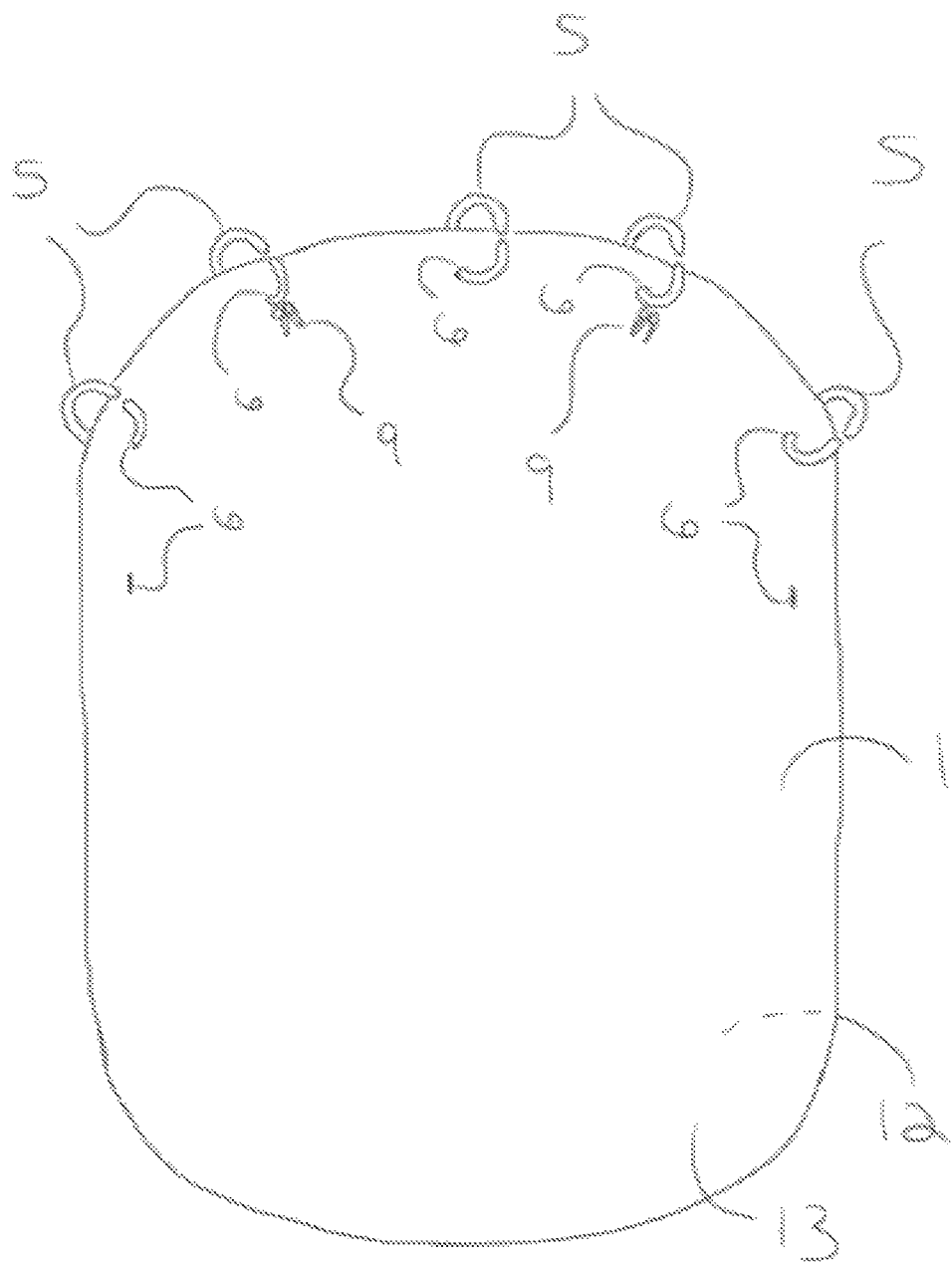

INFANT SEAT COVERING SYSTEM

BACKGROUND AND SUMMARY

The present invention relates generally to infant seats (e.g. car seats & strollers), and specifically to covers for such seats. It is advantageous to provide a cover for such seats (e.g. protect infants from sunlight, wind or other weather conditions). The present invention can be made of water and/or wind proof materials in addition to ordinary fabrics and other materials having suitable strength and flexibility characteristics.

Prior art systems (FIG. 5) have laces 101 that engage the handle portions of infant seats and round clasps that fit through eyelets 102 to engage the seat. However, such systems are problematic because laces 101 can only engage handles (e.g. handle 16) of such seats and cannot engage the fabric inserts common to those seats. Additionally, the round clasps used cannot accommodate the handles of most car seats currently available. Additionally, prior art systems are also not designed to overlap the infant seat. This causes problematic exposure of the infant.

The present invention overcomes these disadvantages as well as provides other objects and advantages as discussed herein and as would be appreciated by those of skill in the art.

Elastic side straps (as opposed to laces) secure the cover to an infant seat. Each side strap has a hook at the end thereof and each is effective to connect the cover to the fabric interior insert of an infant seat (and stroller) as well as the handle and/or the structure (i.e. plastic body thereof).

Every car seat or stroller has some type of fabric interior insert. The hooks are secured to such covers. Doing so is advantageous because if an infant starts kicking, the cover still stays secure.

Prior art systems use Velcro (trademark) strips placed longitudinally along the cover (hook portion on one side and looped portion on the reverse side) to facilitate rolling it up. Such systems are problematic because the Velcro traps lint, etc and other debris upon being washed in a washing machine thereby losing its effectiveness. Velcro is also problematic because the Velcro is sewn inside the cover, which can cause scratching of the bare feet of infants. The present invention uses a series of retraction eyelets disposed longitudinally along the cover underside which are then engaged by retraction hooks near the upper portion of the cover on the front side thereof.

A plurality of ovoid clasps and cooperating eyelets is provided wherein each ovoid clasp is inserted through a cooperating eyelet and engages an upper portion of an infant seat (or stroller canopy) thus achieving another advantage of the present invention. Prior art systems utilize a round clasp which is ineffective to engage the upper portion of some infant seats. The ovoid shape allows greater flexibility.

BRIEF DESCRIPTION OF THE DRAWINGS

FIG. 1 depicts a perspective view of one embodiment of the invention.

FIG. 2 depicts a plan view of back portion 12 of one embodiment of the invention.

FIG. 3 depicts a plan view of front portion 13 of one embodiment of the invention.

DETAILED DESCRIPTION

Figure 4A:
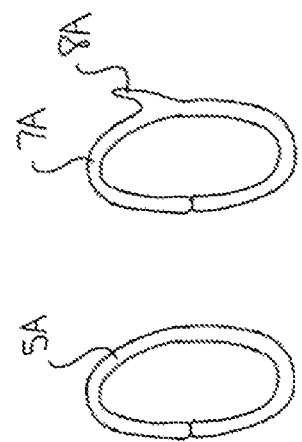
FIG. 4A depicts a plan view of alternative embodiments of the ovoid clasp.

One embodiment of an infant seat covering system comprises cover 1, two elastic side straps 2, each being secured to cover 1 approximate lower portion 4 of each of the cover sides, on back portion 12 thereof, each elastic side strap 2 having hook 3 at the end thereof; a plurality of ovoid clasps 5 and cooperating eyelets 6 whereby each ovoid clasp 5 is inserted through a cooperating eyelet for engaging an infant seat 15, cooperating eyelets 6 being disposed approximate upper portion 11 of cover 1; two retraction hooks 9 for engaging a series of retraction eyelets 10 disposed longitudinally along back portion 12 of cover 1, refraction hooks 9 being disposed near upper portion 11 of cover 1 on front portion 13 thereof.

Elastic side straps 2 can be covered by fabric for aesthetic purposes. Cover 1 is substantially planar and long enough to cover a conventional infant seat (e.g. car seat, stroller). This is advantageous because a covered interior is not exposed when the infant kicks and jostles about. In one embodiment, cover 1 is substantially 27.5 inches long by 20.5 inches wide and generally has a shape as depicted in FIGS. 2 & 3.

Elastic side straps 2 secure cover 1 to infant seat 15. Side straps 2 have hooks 3 at the end thereof and are effective to connect the cover to the fabric interior insert of an infant seat. Every car seat or stroller has some type of fabric interior insert. The hooks are secured to such covers. Doing so is advantageous because if an infant starts kicking, the cover still stays secure.

In operation, cover 1 is attached to an infant seat (it is to be noted that cover 1 can also be attached to other infant seats such as car seats and strollers) as shown in FIG. 1 with hooks 3 engaging the interior insert of an infant seat. Cover 1 can be then retracted to one or more retracted positions according to retraction eyelets 10. As cover 1 is rolled up retraction eyelets 10 are sequentially aligned with retraction hooks 9.

In one embodiment, retraction eyelets 10 are disposed in vertical eyelet mounting strips 17 which are attached to cover 1 on back portion 12; each vertical eyelet mounting strip 17 has four retraction eyelets 10 disposed therein.

It should be noted that each ovoid clasp can engage not only upper portion 14 of infant seat 15, but also handle 16 of infant seat 15.

Figure 4:
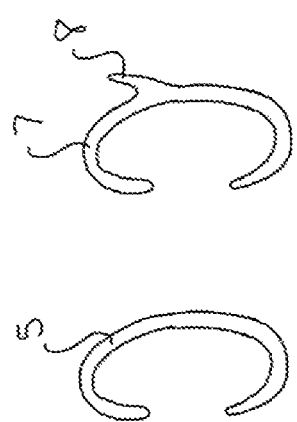
FIG. 4 depicts a plan view of alternative embodiments of the ovoid clasp.
Figure 5:
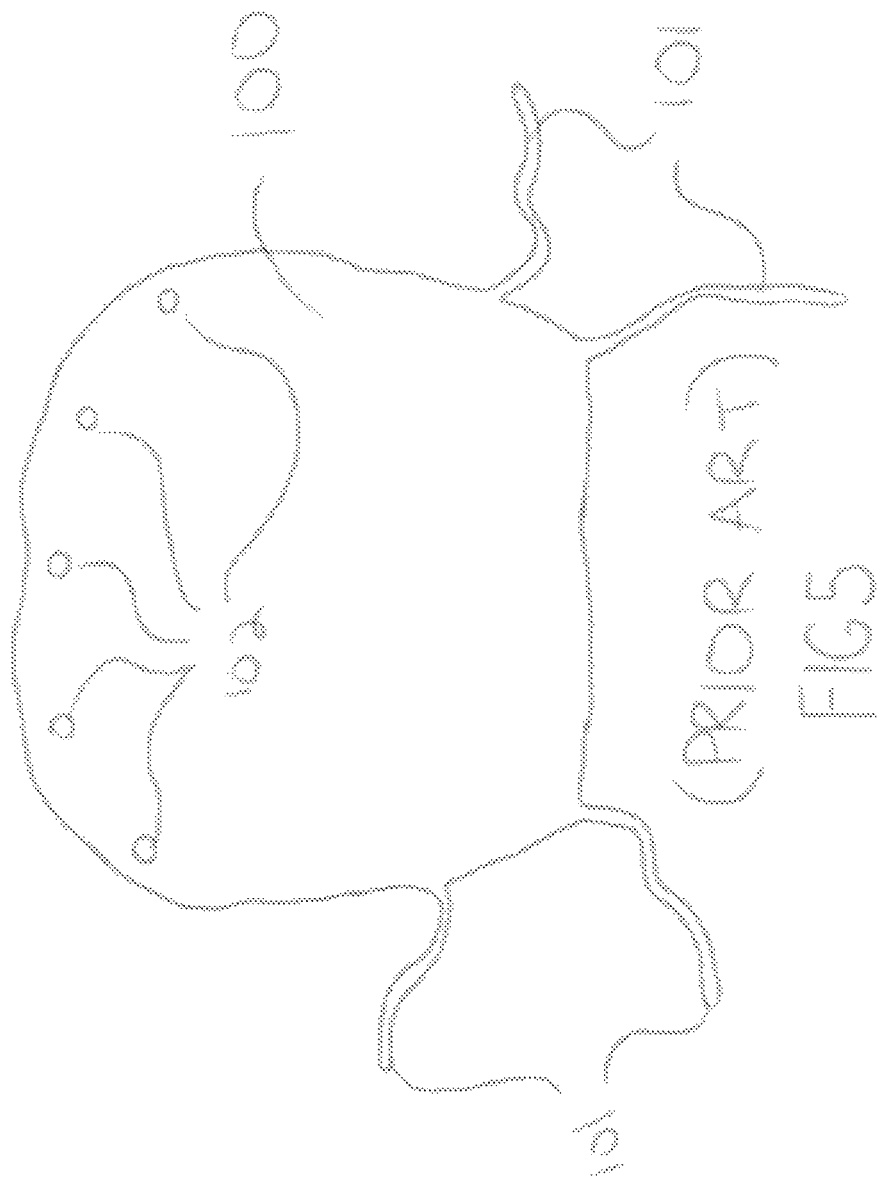
FIG. 5 depicts a prior art system.

In an alternative embodiment (FIG. 4), hooked ovoid clasp 7 replaces ovoid clasp 5 wherein hooked portion 8 of hooked ovoid clasp 7 accomplishes the function of, and replaces, retraction hooks 9.

What is claimed is:

1. An infant seat covering system comprising:

a cover being of sufficient length to overlap an infant seat;

two elastic side straps, each being secured to the cover proximate a lower portion of each side of the cover, each elastic strap having a hook at an end thereof;

a plurality of ovoid clasps and cooperating eyelets whereby each ovoid clasp is inserted through a cooperating eyelet for engaging an infant seat;

and two retraction hooks for engaging a series of retraction eyelets disposed longitudinally along a back portion of the cover, the retraction hooks being disposed on an upper portion of the cover and on a front portion of the cover whereby the cover can be retracted to one or more retracted positions according to the refraction eyelets.

2. The system of claim 1 further comprising:

the cover being substantially 20.5 inches wide by 27.5 inches high.

* * * * *